US010830444B2

(12) United States Patent
Bickley

(10) Patent No.: US 10,830,444 B2
(45) Date of Patent: Nov. 10, 2020

(54) COMBUSTION STAGING SYSTEM

(71) Applicant: ROLLS-ROYCE PLC, London (GB)

(72) Inventor: Daniel J Bickley, Solihull (GB)

(73) Assignee: Rolls-Royce PLC, London (GB)

( * ) Notice: Subject to any disclaimer, the term of this patent is extended or adjusted under 35 U.S.C. 154(b) by 284 days.

(21) Appl. No.: 16/012,054

(22) Filed: Jun. 19, 2018

(65) Prior Publication Data

US 2018/0372322 A1 Dec. 27, 2018

(30) Foreign Application Priority Data

Jun. 23, 2017 (GB) .................................. 1710044.7

(51) Int. Cl.
F23R 3/34 (2006.01)
F23R 3/28 (2006.01)
(Continued)

(52) U.S. Cl.
CPC ................ F23R 3/346 (2013.01); F02C 7/14 (2013.01); F02C 7/222 (2013.01); F02C 7/228 (2013.01);
(Continued)

(58) Field of Classification Search
CPC .......... F23R 3/346; F02C 7/222; F02C 7/228; F02C 7/232; F02C 9/263
See application file for complete search history.

(56) References Cited

U.S. PATENT DOCUMENTS 4,337,616 A 7/1982 Downing
4,949,538 A 8/1990 Iasillo et al.
(Continued)

FOREIGN PATENT DOCUMENTS

GB 2041085 A 9/1980
GB 2532388 A 5/2016

OTHER PUBLICATIONS

U.S. Appl. No. 16/011,865, filed Jun. 19, 2018 in the name of Martin K Yates et al.
(Continued)

Primary Examiner — Arun Goyal
(74) Attorney, Agent, or Firm — Oliff PLC

(57) ABSTRACT

A combustion staging system is provided for fuel injectors of a multi-stage combustor of a gas turbine engine. The system has a splitting unit which receives a metered total fuel flow and controllably splits the metered total fuel flow into out-going pilot and mains fuel flows to perform pilot-only and pilot-and-mains staging control of the combustor. The system further has pilot and mains fuel manifolds which respectively receive the pilot and mains fuel flows, the mains fuel manifold being split into a primary line and a servo line such that each line receives a respective portion of the mains fuel flow. The system further has a plurality of mains flow control valves which distribute the mains fuel flow from the mains fuel manifold to mains discharge orifices of respective injectors of the combustor, both the primary line and the servo line extending to the mains flow control valves before reuniting. The system further has a servo pump operable to change the pressure in the servo line relative to the pressure in the primary line. Each mains flow control valve has a chamber containing a movable piston, the chamber to a primary side of the piston being fed by the primary line, and the chamber to a servo side of the piston being fed by the servo line. The piston is biased towards a closed pilot-only position which prevents flow out of the primary side of the chamber to the mains discharge orifice of the respective injector. The piston is movable under an increase in pressure in the servo line relative to the primary line to an open pilot-and-mains position which allows flow out of the primary side of the chamber to the mains discharge orifice of the respective injector.

15 Claims, 6 Drawing Sheets

(51) Int. Cl.

| | | |
|---|---|---|
| | *F23K 5/14* | (2006.01) |
| | *F23K 5/06* | (2006.01) |
| | *F02C 9/34* | (2006.01) |
| | *F02C 7/228* | (2006.01) |
| | *F02C 7/232* | (2006.01) |
| | *F02C 9/26* | (2006.01) |
| | *F02C 7/14* | (2006.01) |
| | *F02C 7/22* | (2006.01) |

(52) U.S. Cl.
CPC .............. *F02C 7/232* (2013.01); *F02C 9/263* (2013.01); *F02C 9/34* (2013.01); *F23K 5/06* (2013.01); *F23K 5/147* (2013.01); *F23R 3/283* (2013.01); *F23R 3/343* (2013.01); *F05D 2240/35* (2013.01); *F23N 2235/24* (2020.01)

(56) References Cited

U.S. PATENT DOCUMENTS

| | | |
|---|---|---|
| 4,992,027 A | 2/1991 | Acosta |
| 5,339,636 A | 8/1994 | Donnelly et al. |
| 5,442,922 A | 8/1995 | Dyer et al. |
| 5,881,550 A | 3/1999 | Toelle |
| 6,955,040 B1 | 10/2005 | Myers, Jr. et al. |
| 8,887,752 B2 | 11/2014 | Rawlinson |
| 8,925,322 B2 | 1/2015 | Scully et al. |
| 9,121,349 B2 | 9/2015 | Griffiths et al. |
| 9,404,423 B2 | 8/2016 | Griffiths et al. |
| 9,574,448 B2 | 2/2017 | Snodgrass et al. |
| 10,288,294 B2 | 5/2019 | Griffiths et al. |
| 2011/0146823 A1 | 6/2011 | Griffiths et al. |
| 2011/0289925 A1 | 12/2011 | Dyer et al. |
| 2012/0159953 A1 | 6/2012 | Griffiths et al. |
| 2013/0042920 A1 | 2/2013 | Snodgrass et al. |
| 2015/0192075 A1 | 7/2015 | Griffiths |
| 2016/0273775 A1 | 9/2016 | Griffiths et al. |
| 2017/0298840 A1 | 10/2017 | Doody |

OTHER PUBLICATIONS

U.S. Appl. No. 16/012,436, filed Jun. 19, 2018 in the name of Michael Griffiths.

U.S. Appl. No. 16/011,741, filed Jun. 19, 2018 in the name of Daniel J Bickley.

May 27, 2020 Office Action issued in U.S. Appl. No. 16/011,741.

Jun. 18, 2020 Office Action Issued in U.S. Appl. No. 16/011,865.

Jun. 24, 2020 Office Action Issued in U.S. Appl. No. 16/012,436.

COMBUSTION STAGING SYSTEM

FIELD OF THE INVENTION

The present invention relates to a combustion staging system for fuel injectors of a multi-stage combustor of a gas turbine engine.

BACKGROUND

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging condition.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the injectors, a check valve, known as a flow scheduling valve (FSV), is typically associated with each feed in order to retain a primed manifold when de-staged and at shut-down. The FSVs also prevent fuel flow into the injector nozzle when the supply pressure is less than the cracking pressure (i.e. less than a given difference between manifold pressure and combustor gas pressure).

Multi-stage combustors may have further stages and/or manifolds. For example, the pilot manifold may be split into two manifolds for lean blow-out prevention during rapid engine decelerations.

During pilot-only operation, the splitter valve directs fuel for burner flow only through the pilot fuel circuit (i.e. pilot manifold and feeds). It is therefore conventional to control temperatures in the de-staged (i.e. mains) fuel circuit to prevent coking due to heat pick up from the hot engine casing. One known approach, for example described in EP A 2469057, is to provide a separate recirculation manifold which is used to keep the fuel in the mains manifold cool when it is deselected. It does this by keeping the fuel in the mains manifold moving, although a cooling flow also has to be maintained in the recirculation manifold during mains operation to avoid coking.

However, a problem with such a system is how to accommodate a mains FSV failing to an open condition. In pilot-only operation, when cooling flow is passing through the recirculation manifold and the mains manifold, such a failure can result in the cooling flow passing through the failed open FSV through one injector into the combustor, causing a hot streak which may lead to nozzle and turbine damage. In pilot and mains operation, such a failure can produce a drop in mains manifold pressure which causes other mains FSVs to close. A possible outcome is again that a high proportion of the total mains flow passes through the failed open FSV to one injector, causing a hot streak leading to nozzle and turbine damage.

In principle, such failure modes can be detected by appropriate thermocouple arrangements, e.g. to detect hot streaks. However, temperature measurement devices of this type can themselves have reliability issues.

Further, the problem of mains FSV failure can be exacerbated by system arrangements used to prevent combustion chamber gas ingress through the fuel injectors during pilot only operation. Whilst the impact of such gas ingress is generally non-hazardous, it can lead to hot gas-induced degradation of FSV seals. Degraded FSV sealing can in turn lead to dribbling of fuel into de-staged nozzles, resulting in component blockage due to coking.

US 2016/0273775 proposes a fuel staging system (reproduced in FIG. 1) that addresses some of the above problems. The staging system splits the fuel under the control of the engine electronic controller (EEC—not shown) into two flows: one at a pressure $PB_{p1}$ for first 131 and second 132 pilot manifolds and the other at a pressure $P_{fsv}$ for a mains manifold 133. The first pilot manifold feeds pilot discharge orifices of a subset of the fuel injectors. The second pilot manifold feeds pilot discharge orifices of the rest of the fuel injectors. The mains manifold feeds mains discharge orifices of all the fuel injectors. Mains fuel flow scheduling valves (FSVs) 140 at the injectors prevent combustion chamber gases entering the respective manifolds and also provide a drip tight seal between the mains manifold and the injectors when mains is de-staged. By varying the fuel split between the manifolds, the EEC can thus perform staging control of the engine.

In more detail, the staging system 130 has a fuel flow splitting valve (FFSV) 135, which receives a metered fuel flow from a hydro-mechanical unit (HMU) of the engine at pressure $P_{fmu}$. A spool is slidable within the FFSV under the control of a servo-valve 146, the position of the spool determining the outgoing flow split between a pilot connection pipe 136 which delivers fuel to the first 131 and second 132 pilot manifolds and a mains connection pipe 137 which delivers fuel to the mains manifold 133. The spool can be positioned so that the mains stage is deselected, with the entire metered flow going to the pilot stage (except that a cooling flow is sent to the mains manifold during pilot-only operation, as discussed in more detail below). An LVDT (not shown) can provide feedback on the position of the spool to the EEC, which in turn controls staging by control of the servo-valve 146.

The pilot discharge orifices are divided into two groups by the first 131 and second 132 pilot manifolds in order to provide lean blow out protection. More particularly, the second pilot manifold connects to the pilot connection pipe 136 via a further connection pipe 139 (at a pressure $PB_{p2}$) and a lean blow out protection valve 141. This is operable to terminate or substantially reduce the supply of fuel to the second pilot manifold and associated pilot discharge orifices, when desired, so as to increase the flow of fuel to the first pilot manifold and associated discharge orifices under low fuel conditions for a given metered flow from the HMU. In the arrangement illustrated, the valve 141 is controlled by way of a solenoid operated control valve 142, although other forms of control are possible, such as by a servo-type valve (for example an electro hydraulic servo-valve). In this way, under low fuel conditions the flow of fuel to the pilot discharge orifices may be directed preferentially via the first pilot manifold, whereby the risk of a lean blow out condition arising can be reduced. Further details of such lean blow out protection are described in EP A 2469057.

The part of the staging system 130 comprising the FFSV 135, servo-valve 146, lean blow out protection valve 141 and control valve 142 may be housed in a staging unit mounted to a fan case of the engine. The connection pipes 136, 137, 139 then extend across a bypass duct of the engine to the manifolds 131, 132, 133, which wrap around the core engine in proximity to the injectors 134. Alternatively, the staging system can be mounted to the engine core.

In the staging system described in EP A 2469057, each injector has a pilot FSV and a mains FSV for respectively the flows from pilot and mains manifolds. In contrast, in the staging system shown in FIG. 1, pilot FSVs are not necessary (although optional pilot FSVs can be located between the mains FSVs 140 and the pilot discharge orifices), and instead pilot flow is routed through modified mains FSVs 140 with negligible restriction: the mains FSVs 140 distribute the mains flow from the mains manifold 133 to the mains discharge orifices in the injectors 134, while the pilot flow is passed through the mains FSVs for valve cooling purposes. These FSVs each have a chamber containing a movable, spring-biased piston, with the chamber to a pilot (spring) side of the piston being in fluid communication with the respective pilot fuel manifold 131, 132 and the chamber to a mains (non-spring) side of the piston being in fluid communication with the mains fuel manifold 133. In this way, the FSVs 140 have a reduced cracking pressure with the pilot (spring) side of the FSVs being referenced to pilot manifold pressure ($PB_{p1}$ or $PB_{p2}$) rather than the lower mains pressure downstream of the FSVs (as is the case with the system of EP A 2469057). With the low cracking pressure, the pressures on either side of each piston ($P_{fsv}$ and $PB_p$) are approximately equal during the pilot-only operating mode such that the FSV springs maintain the FSVs 140 in a closed position (i.e. no flow from the mains manifold 133 through the FSVs to the mains discharge orifices of the injectors 134). The approximate equalisation of the pressures $P_{fsv}$ and $P_{bp}$ is achieved by energising open a single-stage solenoid-operated mains cooling valve 147 which allows a small cooling flow through the mains manifold 133 to pass to the second pilot manifold 132 through a port in the solenoid valve 147 that is significantly larger than the port in the FFSV 135 feeding the mains connection pipe 137.

In this pilot-only operating mode, the position of the FFSV 135, controlled by the servo-valve 146, is such that there is a large flow number opening between the HMU supply and the pilot connection pipe 136, such that $P_{fmu} \approx PB_{p1} \approx P_{fsv}$. Any difference between the metered fuel pressure ($P_{fmu}$) from the HMU supply and the pilot manifold pressures ($PB_{p1}$ and $PB_{p2}$) is insufficient to open the FSVs 140. In the pilot-only mode there is a small opening in the FFSV between the HMU supply and the mains connection pipe 137 to allow for the cooling flow in the mains manifold 133. The mains manifold remains fully primed in pilot-only mode to reduce the unprimed volume required to be filled when mains flow to the combustor is required. When mains staging is selected solenoid-operated mains cooling valve 147 is closed so that the connection between the mains manifold 133 and the second pilot manifold 132 is closed. Simultaneously, the FFSV 135 (controlled by the servo-valve 146) moves to increase the opening between the HMU supply and the mains connection pipe 137. This reduces $PB_{p1}$ and $PB_{p2}$ relative to $P_{fsv}$, resulting in fuel flow to the mains discharge orifices of the injectors 134.

If one of the FSVs 140 fails such that it opens in pilot-and-mains mode, fuel flows from the HMU supply through the FFSV 135 to the mains manifold 133 and thence through the open port in the failed FSV to the mains discharge orifice of the respective injector 134. However, as the FSVs have a relatively low cracking pressure, only a marginal increase in pressure in the mains manifold, resulting from flow through the port in the failed FSV, causes the other FSVs to open. This then leads to a relatively even distribution of fuel flow injection around the combustor. Thus, by ensuring that the other FSVs open before a severe level of fuel flow through the failed FSV is reached (i.e. a level that results in hot streaks and turbine damage), the staging system 130 can mitigate the potentially hazardous mal-distribution issues associated with failed open mains FSVs in the system of EP A 2469057. The latter incorporates high cracking pressure FSVs, potentially allowing a high level of flow to pass through a single failed open FSV (i.e. gross maldistribution) before the other FSVs crack open.

The staging system 130 also allows complex cooling recirculation architectures to be avoided, which avoids the hazards that can result from combustion gases leaking past mains FSVs and thence to the low pressure side of the fuel system of the system.

Cooling of the FSVs 140 can be provided by the pilot flow that is continuously routed through the FSVs. Cooling arrangements can be provided for the pilot manifolds 131, 132 and the mains 133 manifold, e.g. by using a small portion of the air flow through a bypass duct of the engine, and for the mains manifold in pilot-only operation using the cooling flow discussed below.

The pilot/mains flow split is achieved via movement of the spool within the FFSV 135, with a mains fuel flow sensing valve (MFFSV) 143 being provided on the mains connection pipe 137. The FFSV 135 then provides a coarse split and the MFFSV trims to the required accuracy. The position of the FFSV 135 is controlled via the servo-valve 146 using the position feedback signal from the LVDT 144 attached to the MFFSV 143 to give accurate flow control in the connection pipes 136 and 137. In particular, the position feedback signal that is input to the staging control logic in the EEC is taken from an LVDT 144 measuring a spool position of the MFFSV rather than a spool position of the FFSV. In such an arrangement, MFFSV spool position is a measure of the mains flow.

To provide the cooling flow in the mains manifold 133 during pilot-only operation, the single-stage solenoid-operated mains cooling valve 147 opens a bypass connection between the mains 133 and second pilot 132 fuel manifolds, allowing the cooling flow to pass from the mains fuel manifold to the pilot fuel manifold, and thence onwards for burning at the pilot orifices of the injectors 134. The mains cooling valve 147 closes during pilot-and-mains operation. The mains cooling valve has a relatively large minimum orifice size, and thus is relatively insensitive to contamination and ice build-up.

In the pilot-only operating mode, the cooling flow of fuel passes continuously from the mains manifold 133 to the second pilot fuel manifold 132, which maintains cooling in the mains manifold. This cooling flow is sensed by the MFFSV 143 and the feedback signal from the MFFSV LVDT 144 to the EEC is used to adjust the spool position of the FFSV 135 (via the servo-valve 146) if the cooling flow needs to be altered. In pilot-only operating mode, even with the cooling flow the pressure drop across each FSV piston ($P_{fsv} - PB_p$) is insufficient to open the FSVs.

When the pilot-and-mains operating mode is selected, the solenoid operated mains cooling valve 147 is closed, and the spool position of the FFSV 135 is altered to increase the opening of the mains port of the FFSV and reduce the opening of the pilot port of the FFSV, which increases the pressure differential $P_{fmu} - PB_{p1}$ across the pilot port, thus producing a rise in pressure $P_{fsv}$ relative to $PB_{p1}$ and $PB_{p2}$.

This results in the pistons of the FSVs 140 opening against their respective spring forces, and fuel flowing through the FSVs to the mains discharge orifices of the injectors 134. The MFFSV 143 now senses the flow to the mains discharge orifices of the injectors and the feedback signal from the LVDT 144 is used to adjust the FFSV spool position via the EEC and FFSV servo-valve 146 to set the correct pilot/mains flow split.

Thus inclusion of the MFFSV 143 on the mains connection pipe 137 enables accurate control of the pilot/mains split irrespective of FSV tolerances, variation and friction. The MFFSV position from the LVDT 144 is a measure of mains manifold cooling flow during pilot-only operation, and total mains burnt flow during pilot-and-mains operation. This flow measurement signal is sent to and used by the EEC control logic to provide an MFFSV position demand signal that is used to drive the FFSV servo-valve 146 to move the FFSV 135 to set the correct pilot/mains flow split (during pilot-and-mains operation) or the correct mains cooling flow (during pilot-only operation).

Although the fuel staging system of US 2016/0273775 addresses many of the problems of the system of EP A 2469057, a difficulty arises in that the closed loop control of the fuel split using the MFFSV 143 also involves the EEC. In particular, the digital sample and hold processes of the EEC introduce phase lag in any control loop using the EEC. This limits the maximum gain that can be set within the loop, given loop stability considerations, and thus limits response of the closed loop. Typical sample periods for the EEC limit loop bandwidth to 1-2 Hz, which may not be fast enough for accurate dynamic control of fuel flow to the engine.

A difficulty in relation to the FSVs is variation in the level of piston/sleeve friction acting on individual FSVs. This can result in poor burner-to-burner flow distribution and thus impacts emissions and turbine life.

The difficulties associated with maldistribution due to a failed open FSV or valve-to-valve frictional variations can be addressed by increasing the size of the FSVs, as they can then have higher spring loads to provide a higher closing force margin and to reduce the impact of piston/sleeve friction on burner-to-burner flow distribution. More particularly, a high spring load requires a large piston diameter in order to reduce the pressure differential required to open the valve to an acceptable level. Indeed, it can be advantageous to minimise the required differential so as to limit burner-to-burner maldistribution in mains flow resulting from a stuck open FSV. A further driver for large FSVs is that pressure losses in the pilot manifold result in different pilot pressures at the FSVs. Although these losses are typically small, they can be significant relative to the differential pressure required to open each valve, and the spring load of all the FSVs must be high enough to ensure that the valve which sees the lowest pilot pressure is able to close and remain closed when de-staging mains. However, there are significant disadvantages with using large FSVs. They add weight to the engine, and also may not be feasible to implement if space constraints are tight.

A further difficulty in relation to the FSVs is that, because the pilot flow is routed through the FSV chamber to the pilot side of the piston for cooling, reverse purge of the pilots manifold at shutdown can put the FSV at risk due to back-flushing of contamination from downstream filters. In particular, contaminants can degrade FSV regulation as well as the sealing used within the valve to isolate delivery of fuel to the mains combustion zone.

Yet another difficulty in relation to the FSVs is that movement of the FSV pistons during modulation of the staging system can result in a displacement of fuel between pilot and mains, causing undesired flow transients (i.e. dips and spikes).

SUMMARY

It would be desirable to provide a combustion staging system that addresses some or all of these difficulties.

In a first aspect, the present invention provides a combustion staging system for fuel injectors of a multi-stage combustor of a gas turbine engine, the system having:
  a splitting unit which receives a metered total fuel flow
    and controllably splits the metered total fuel flow into
    out-going pilot and mains fuel flows to perform pilot-
    only and pilot-and-mains staging control of the com-
    bustor;
  pilot and mains fuel manifolds which respectively receive
    the pilot and mains fuel flows, the mains fuel manifold
    being split into a primary line and a servo line such that
    each line receives a respective portion of the mains fuel
    flow;
  a plurality of mains flow control valves which distribute
    the mains fuel flow from the mains fuel manifold to
    mains discharge orifices of respective injectors of the
    combustor, both the primary line and the servo line
    extending to the mains flow control valves before
    reuniting; and
  a servo pump operable to change the pressure in the servo
    line relative to the pressure in the primary line; and
  wherein each mains flow control valve has a chamber
    containing a movable piston, the chamber to a primary
    side of the piston being fed by the primary line, the
    chamber to a servo side of the piston being fed by the
    servo line, the piston being biased towards a closed
    pilot-only position which prevents flow out of the
    primary side of the chamber to the mains discharge
    orifice of the respective injector, and the piston being
    movable under an increase in pressure in the servo line
    relative to the primary line to an open pilot-and-mains
    position which allows flow out of the primary side of
    the chamber to the mains discharge orifice of the
    respective injector.

Advantageously, having the mains flow control valves operated by a pressure differential between the servo and primary lines of the mains fuel manifold allows many of the difficulties associated with the mains FSVs of US 2016/0273775 to be avoided. In particular, the force margins for the control valves can be large, making the system more robust to contamination and coking, with less sensitivity to variation in valve internal friction. This reduces the potential for burner-to-burner flow mal-distribution, and thus the potential for degraded emissions and excessive turbine life reduction. A high servo line pressure differential permits a smaller valve and thus eases packaging of the valve in a burner head of an injector.

In addition, displacement of flow between the pilots and mains when staging-in and modulating flows can be reduced as a result of the ability to remove pilot flow from the mains flow control valves.

In a second aspect, the present invention provides a fuel supply system having:
  a total fuel metering valve which is configured to receive
    a flow of pressurised fuel and to form therefrom a
    metered total fuel flow; and a combustion staging system according to the first aspect, the splitting unit of the combustion staging system receiving the metered total fuel flow from the fuel metering valve.

The fuel supply system may further have a pressure drop control arrangement (such as a spill valve and a pressure drop control valve) which is operable to maintain a substantially constant pressure drop across the total fuel metering valve. The fuel supply system may further have a pressure raising and shut-off valve in the flow path of the metered total fuel flow between the total fuel metering valve and the combustion staging system.

In a third aspect, the present invention provides a gas turbine engine having the fuel supply system of the second aspect.

Optional features of the invention will now be set out. These are applicable singly or in any combination with any aspect of the invention.

Typically the piston of the mains flow control valve is spring biased towards the closed pilot-only position. For example, the chamber to the servo side of the piston can contain a compression spring biasing the piston towards the closed pilot-only position.

The servo pump can be a positive displacement pump, such as a gear pump etc. Another option, however, is for the servo pump to be a roto-dynamic pump, such as a centrifugal pump.

The servo pump can be electrically, hydraulically (e.g. by fuel or other liquid) or pneumatically powered.

The primary line and the servo line may conveniently reunite downstream of a back pressure orifice located in the servo line to maintain the changed pressure in the servo line relative to the pressure in the primary line.

The combustion staging system may further have a relief valve connected across the servo pump to relieve excess pressure in the servo line e.g. in the case of blockage at the back pressure orifice. Such a relief valve may be particularly desirable when the servo pump is a positive displacement pump. However, if the servo pump is electrically powered another option for relieving excess pressure in the servo line is to provide a limit on the power supplied to the pump at a given pump speed.

Advantageously, the mains flow control valves may be binary operating valves which are either fully open or fully closed. This can substantially improve the operation and reliability of the valves. Also, from an operation perspective, if a binary operating valve fails open, it is then in the same state as a normally open valve, thus avoiding the potential for burner-to-burner flow mal-distribution when mains is staged-in, decreasing the potential for excessive turbine life reduction.

Conveniently, the mains flow control valves can have single face seals. This is because there is no need for a high degree of sealing between the primary and servo lines (i.e. a degree of leakage between these lines is acceptable). In contrast, the FSVs of US 2016/0273775 have dual-face seals to provide a drip tight seal to stop delivery of flow to the mains combustion process when mains is de-staged. Such dual-face seals are intrinsically less reliable and robust than single face seals.

The splitting unit can include a fuel flow splitting valve, e.g. of the type disclosed in US 2016/0273775. Thus such a valve can have a controllably slidable spool, the position of which determines a split of the metered total fuel flow into the valve between out-going pilot and mains fuel flows from the valve. A position sensor, such as an LVDT, on the fuel flow splitting valve can measure the position of the spool to indicate the pilot/main split. Additionally or alternatively, the splitting unit may further include a fuel flow sensing valve downstream of the fuel flow splitting valve to sense the out-going pilot or mains fuel flow.

However, another option is for the splitting unit to implement a metering and spill architecture. In this case, the splitting unit may include a metering valve and a (further) spill valve, a first portion of the total metered fuel flow received by the splitting unit being an inflow to the metering valve and a second portion of the total metered fuel flow received by the splitting unit being an inflow to the spill valve, the metering valve being configured to controllably determine a fuel flow rate of a metered outflow formed from the first portion of the total metered fuel flow, the spill valve being configured to produce a spilled outflow formed from the second portion of the total metered fuel flow, and the spill valve being further configured to sense a pressure differential between the inflow to and the metered outflow from the metering valve and to vary the amount of the spilled outflow in response to the sensed pressure differential, whereby the metered outflow forms one of the pilot and mains fuel flows, and the spilled outflow forms the other of the pilot and mains fuel flows. Advantageously, the metering valve and the spill valve of the splitting unit can provide purely hydro-mechanical closed loop control of the fuel split. The higher bandwidth of this form of control facilitates more accurate dynamic control of fuel flow to the engine. The use of such a splitting architecture can also reduce the sensitivity of the fuel split to changes in the flow characteristics of downstream components, such as the burner nozzles, which may block progressively over time.

When the splitting unit implements the metering and spill architecture, the splitting unit may further include a mains throttle valve which throttles the out-going mains fuel flow from the splitting unit in response to the pressure of the out-going pilot fuel flow from the splitting unit. In contrast, the FSVs of US 2016/0273775 throttle the mains flow therethrough in response to the pressure of the pilot flow. The mains throttle valve can displace flow in a similar way to the FSVs of US 2016/0273775, but being a single valve its net displacement area can be significantly smaller. This can decrease dynamic cross-talk between the pilot and mains flows, thereby reducing undesirable flow transients.

Preferably, when the splitting unit implements the metering and spill architecture, the metered outflow forms the mains fuel flow, and the spilled outflow forms the pilot fuel flow. This allows the mains fuel flow to be controlled more accurately, which can be particularly beneficial for control of a cooling flow (discussed below) when mains is de-staged. This does not exclude, however, that the metered outflow can form the pilot fuel flow, and the spilled outflow can form the mains fuel flow.

When the splitting unit implements the metering and spill architecture, the metering valve may have a spool whose position is controllable to determine the fuel flow rate of the metered outflow. For example, the position of the spool may be controlled by a servo-valve, e.g. under the command of the engine electronic controller. The metering valve may further have a device to measure the position of the spool. This position measurement can be fed to the engine electronic controller for use in controlling the spool position.

Irrespective of its architecture, the splitting unit may send a cooling flow to the mains fuel manifold during pilot-only operation. In this case, the system may further have a mains cooling valve which, during pilot-only operation, opens a bypass connection between the mains and pilot fuel manifolds such that the cooling flow passes from the mains fuel manifold to the pilot fuel manifold. The cooling flow through the mains fuel manifold in the pilot-only mode then helps to avoid coking in the mains manifold when the mains flow control valves are in their pilot-only positions. Advantageously, the cooling flow can pass to pilot discharge orifices of the injectors for burning in the combustor, avoiding the need for any kind of recirculation architecture and thereby reducing fuel heating and residence time so that the possibility of fuel breakdown is reduced. Preferably, the mains cooling valve is hydraulically operated by the pressure in the servo line relative to the pressure in the primary line. For example, when the servo pump operates to increase the pressure in the servo line relative to the pressure in the primary line, the increased pressure in the servo line may close the mains cooling valve such that the cooling flow passing from the mains fuel manifold to the pilot fuel manifold is interrupted.

When the combustion staging system has the mains cooling valve, the system may further have a non-return valve in the bypass connection which prevents flow in the direction from the pilot fuel manifold to the mains fuel manifold. The non-return valve may further have a device, such as an LVDT, to measure flow through the non-return valve. This measurement can be used to identify a failed open mains flow control valve when mains is de-staged. This helps avoid a need for expensive, complex and potentially unreliable thermocouple-based systems to detect a failed open FSV.

When the splitting unit implements the metering and spill architecture, according to one option for the cooling flow, the spill valve of the splitting unit can send some or all of the cooling flow to the mains fuel manifold during pilot-only operation. In particular, the spill valve may receive a third portion of the total metered fuel flow (e.g. through a fixed servo orifice) and may form some or all of the cooling flow therefrom. Additionally or alternatively, (particularly applicable when the metered outflow forms the mains fuel flow) the metering valve may send some or all of the cooling flow to the mains fuel manifold during pilot-only operation.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 2:
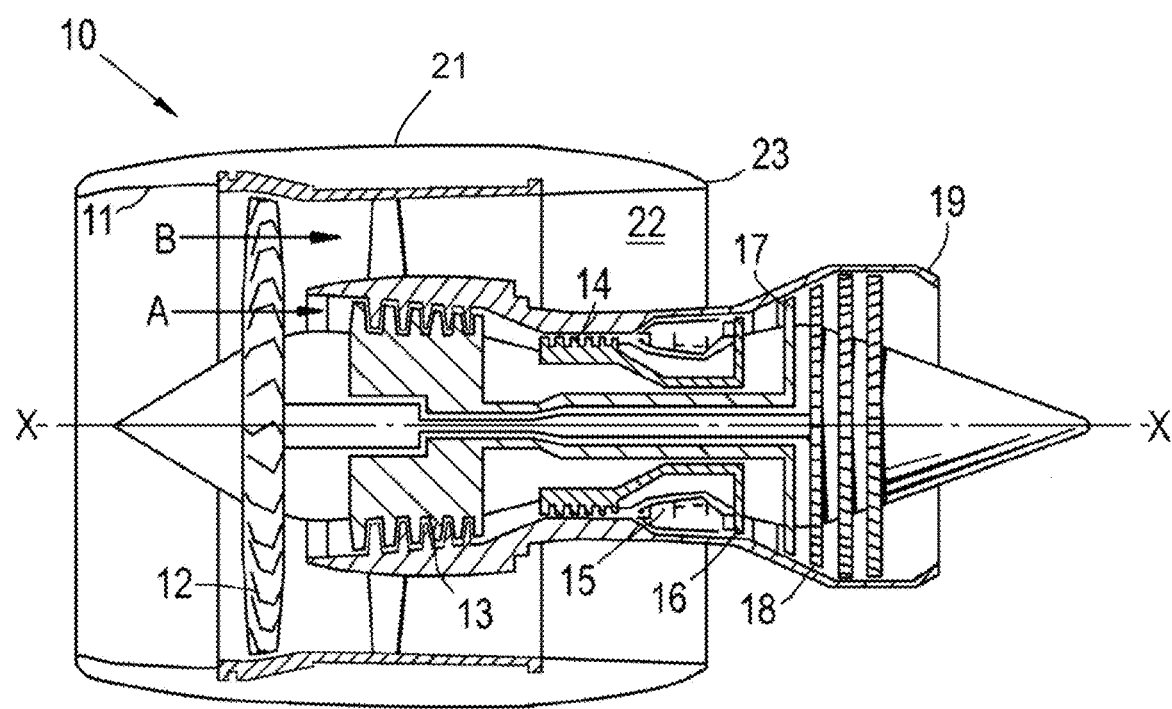
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts. Although FIG. 2 shows a three spool turbofan engine, the present invention is equally applicable to other engine architectures, such as two or single spool engines, and/or geared fan engines.

The engine has a pumping unit comprising a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

A fuel supply system then accepts fuel from the HP pumping stage for feeds to the combustor 15 of the engine 10. This system typically has a hydro-mechanical unit (HMU) comprising a fuel metering valve operable to control the rate at which fuel is allowed to flow to the combustor. The HMU may further comprise a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof in a filtered servo flow for correct operation of any fuel pressure operated auxiliary devices (such variable inlet guide vane or variable stator vane actuators) that receive fuel under pressure from the HMU. Further details of such an HMU are described in EP A 2339147.

An engine electronic controller (EEC—not shown) commands the HMU fuel metering valve to supply fuel at a given flow rate to a staging system 30 (shown schematically in FIG. 3 in pilot+mains operation mode, and in FIG. 4 in pilot-only operation mode) and thence to fuel injectors 34 of the combustor 15. The metered total fuel flow leaves the HMU and arrives at the staging system at a pressure $P_{fmu}$.

Figure 1:
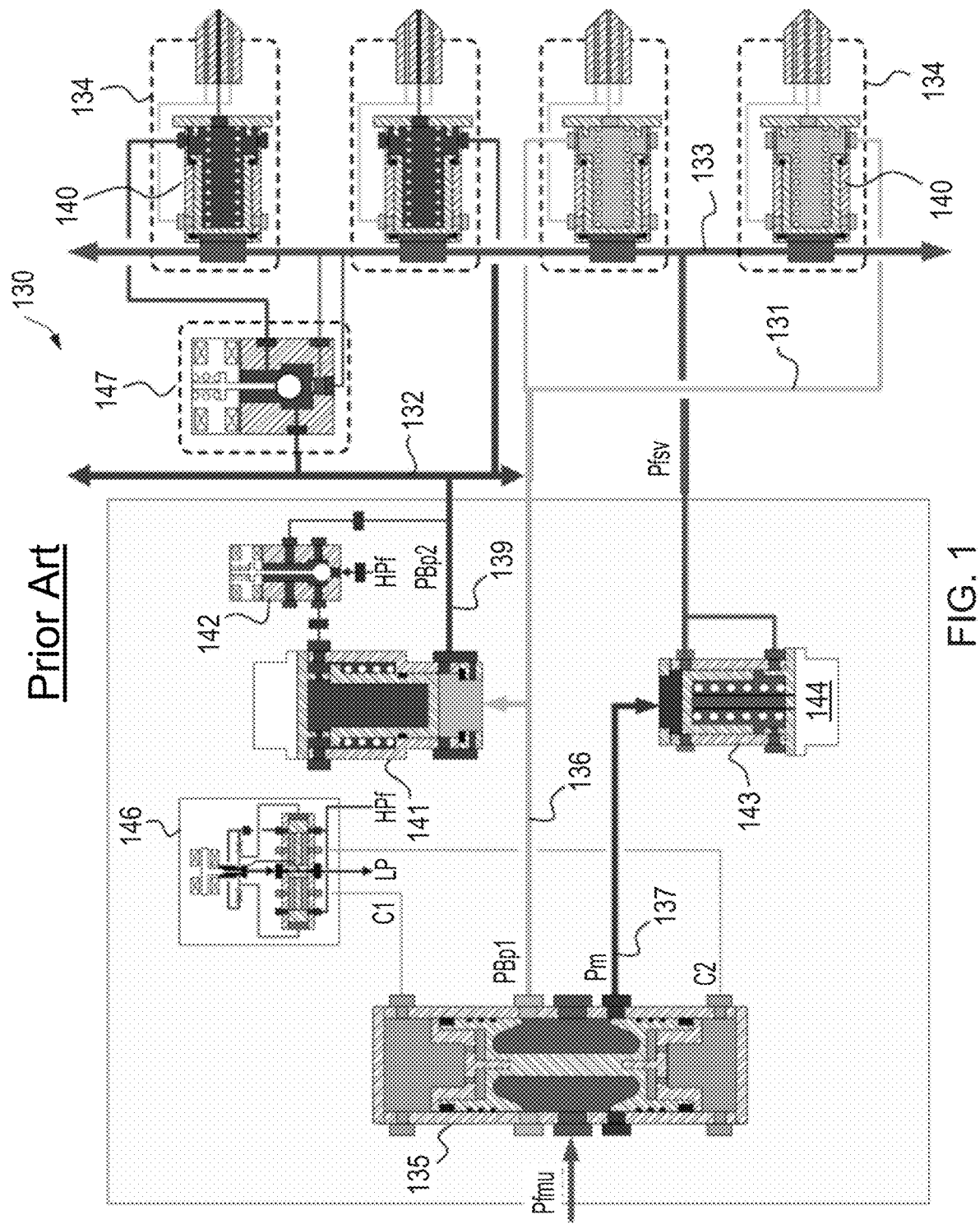
FIG. 1 shows schematically a known staging system for fuel injectors of the combustor of a gas turbine engine of FIG. 1 in pilot-only operating mode.

Parts of the staging system 30 are similar or identical to the corresponding parts of the known system 130 shown in FIG. 1. Thus the staging system 30 splits the fuel under the control of the EEC into two flows: one for first 31 and second 32 pilot manifolds and the other for a mains manifold 33. The first pilot manifold feeds pilot discharge orifices of a subset of the fuel injectors (via respective weight distribution valves—WDVs). The second pilot manifold feeds pilot discharge orifices of the rest of the fuel injectors (also via respective WDVs). The mains manifold feeds mains discharge orifices of all the fuel injectors. A splitting unit 50 (described in more detail below) receives the metered total fuel flow from the HMU and produces an outgoing flow split between a pilot connection pipe 36 which delivers fuel to the first 31 and second 32 pilot manifolds and a mains connection pipe 37 which delivers fuel to the mains manifold 33. The second pilot manifold 32 connects to the pilot connection pipe 36 via a further connection pipe 39 and a lean blow out protection valve 41 controlled by way of a solenoid-operated control valve 42. The splitting unit also sends a cooling flow to the mains manifold during pilot-only operation.

The system 30 has a mains cooling valve 47 which in pilot-only operation opens a bypass connection between the mains manifold 33 and the connection pipe 36, allowing the cooling flow sent to the mains manifold 33 during pilot-only operation to pass from the mains fuel manifold to the pilot fuel manifolds 31, 32, and thence onwards for burning at the pilot orifices of the injectors 34. The mains cooling valve 47 closes during pilot-and-mains operation.

Figure 3:
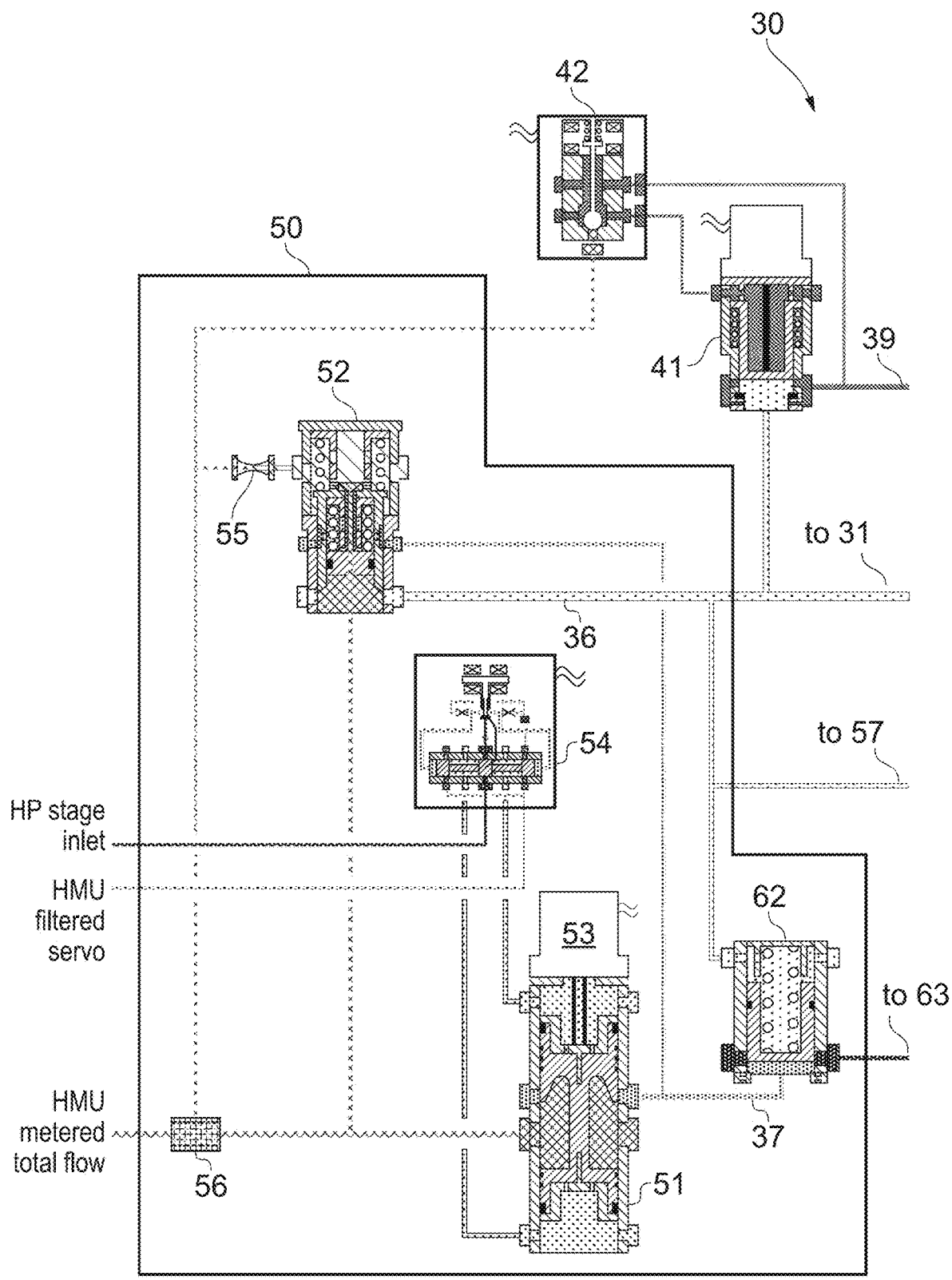
FIG. 3 shows schematically a staging system for fuel injectors of the combustor of the engine of FIG. 2 in pilot+mains operation mode.
Figure 3:
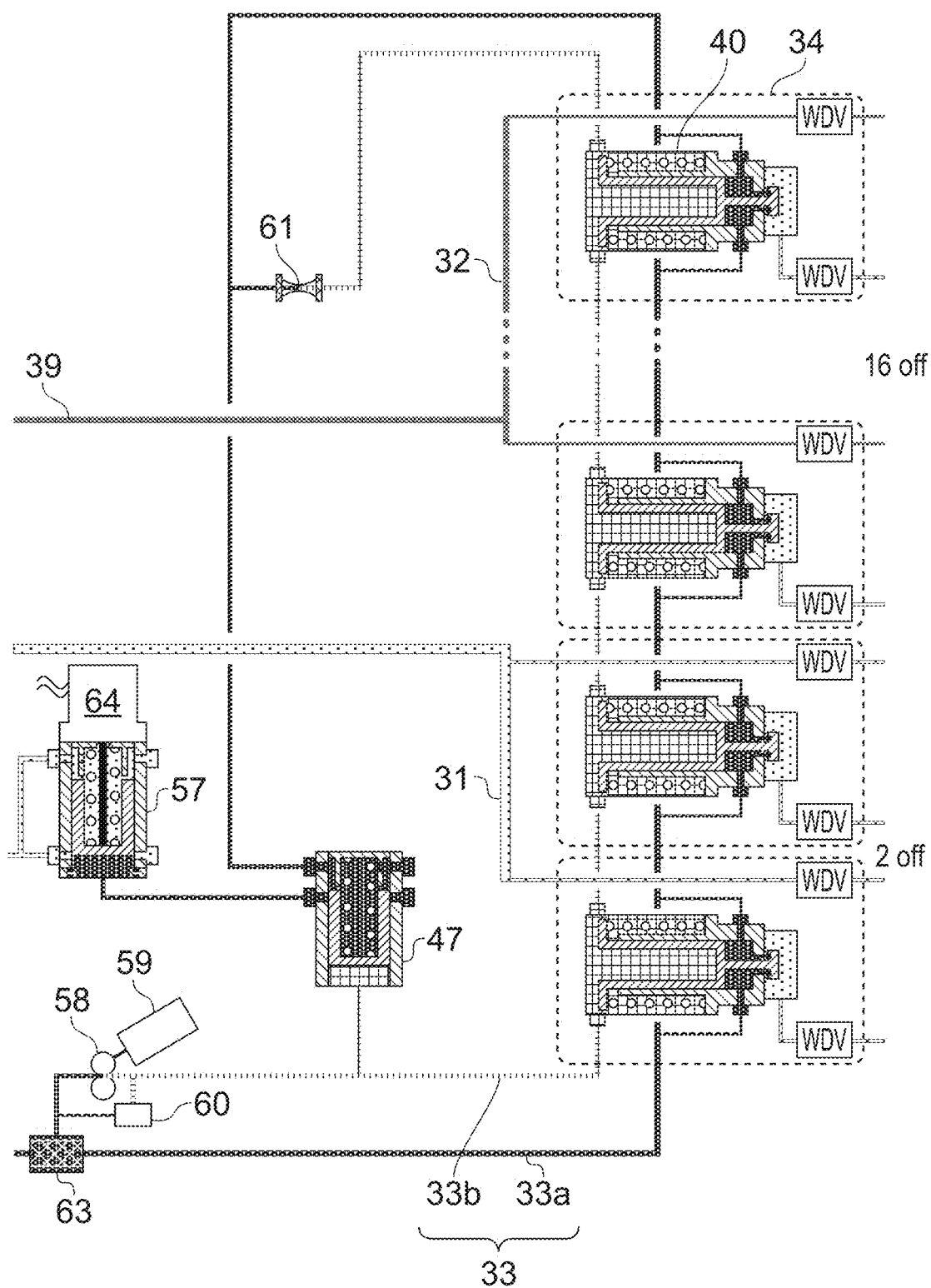
Figure 4:
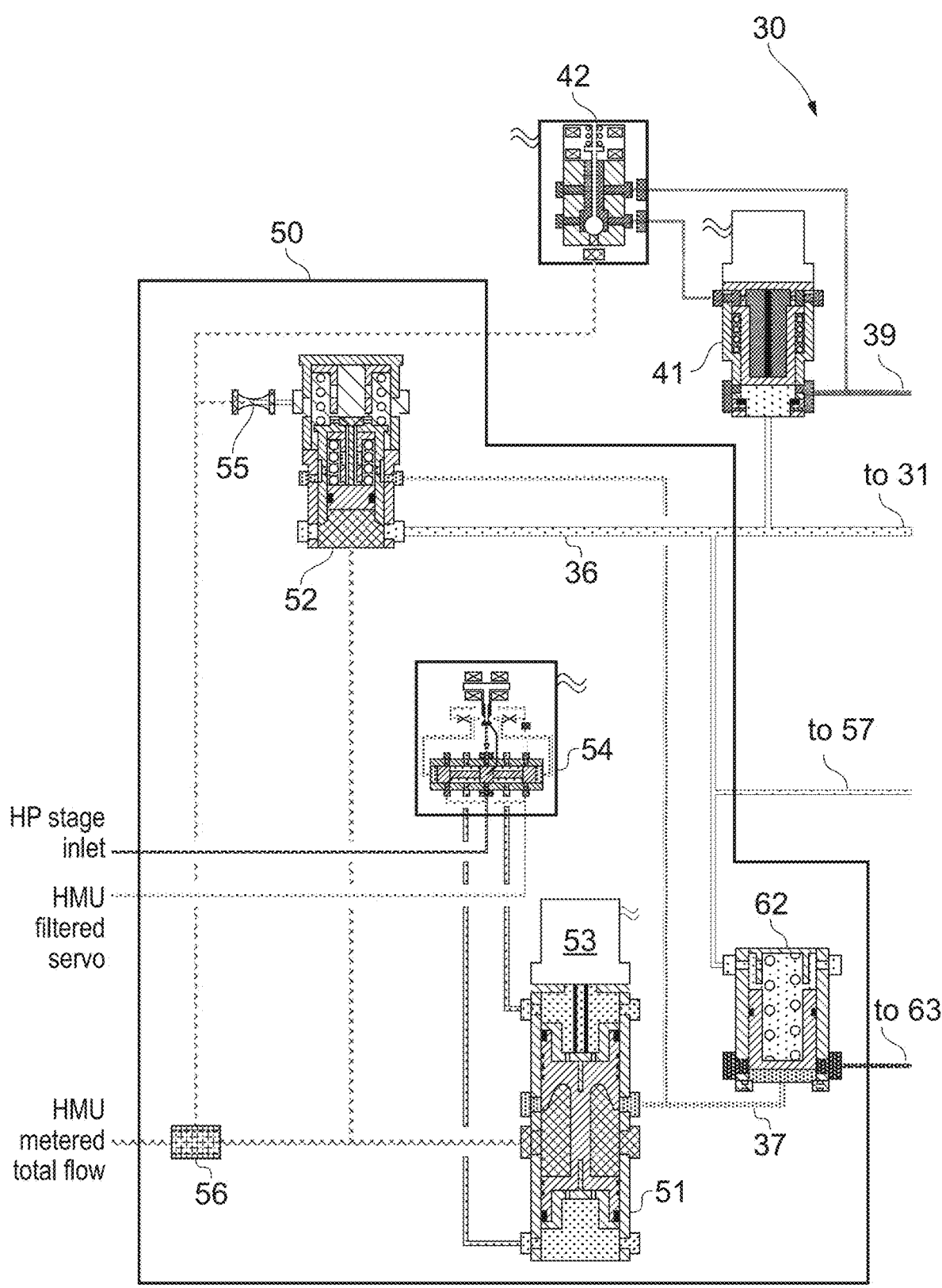
FIG. 4 shows schematically the staging system of FIG. 3 in pilot-only operation mode.
Figure 4:
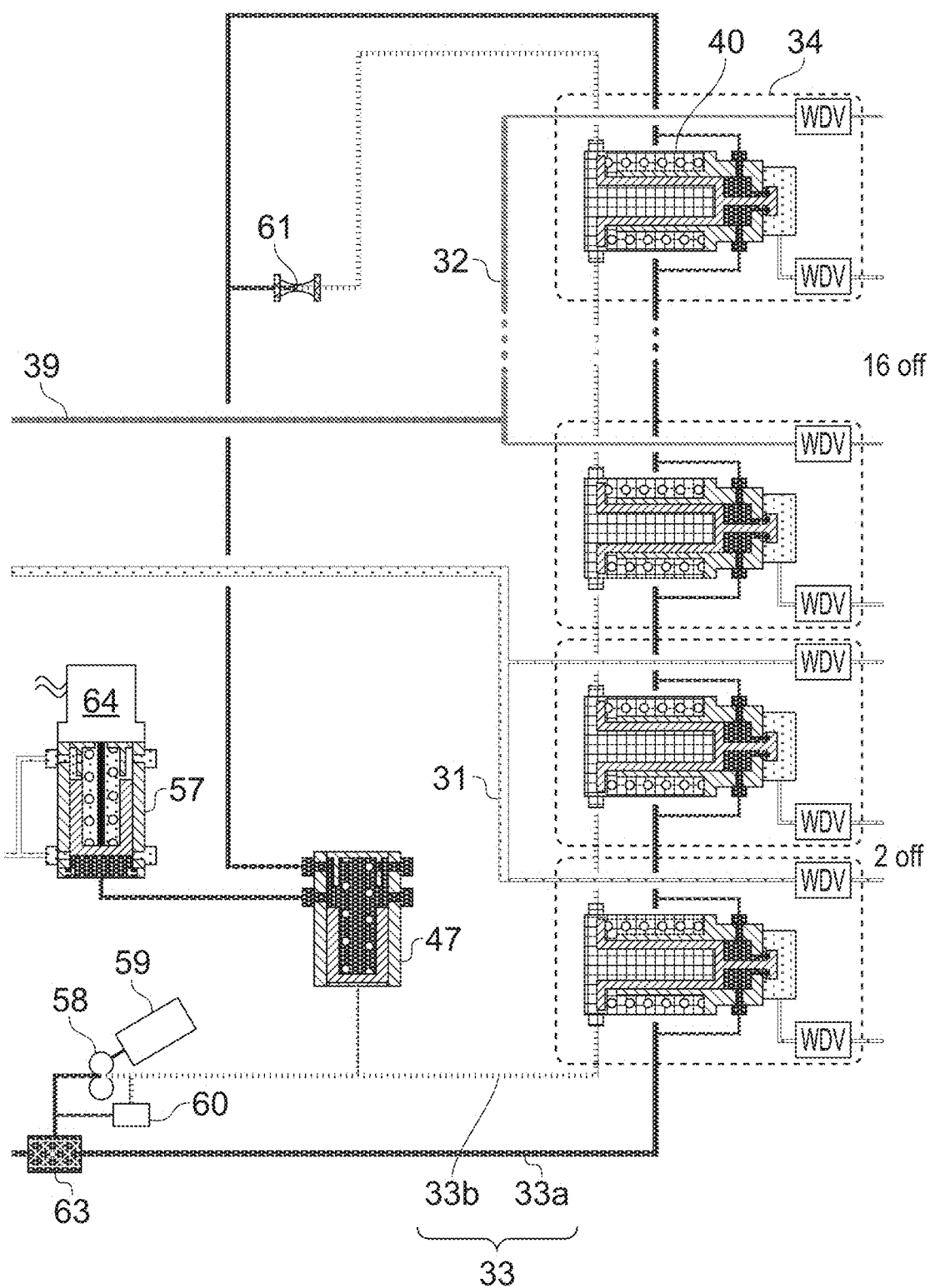

A key difference between the staging system 30 shown in FIGS. 3 and 4 and the known system 130 shown in FIG. 1 is that mains flow control valves 40 are provided at the injectors 34 rather than mains FSVs. Moreover, the mains fuel manifold 33 is split into a primary line 33a and a servo line 33b which each receive a respective portion of the mains fuel flow. The mains flow control valves 40 distribute the mains flow from the primary line to the mains discharge orifices in the injectors 34 via respective WDVs, and the operation of the mains flow control valves is controlled by a pressure differential between the primary and the servo lines. This arrangement is discussed further below after a more detailed discussion of the splitting unit 50.

A further difference between the staging system 30 shown in FIGS. 3 and 4 and the known system 130 shown in FIG. 1 is that the splitting unit 50 has a fuel flow metering and spill architecture rather than a fuel flow splitting valve and a fuel flow sensing valve. However, although the metering and spill architecture provides advantages, which are discussed below, an architecture based on a fuel flow splitting valve could be implemented instead.

More particularly, the splitting unit 50 has a staging metering valve (SMV) 51 providing a variable metering orifice with a known, and accurately controlled, relationship between area and metering spool position. Control of the position of the spool of the SMV allows control of the metering orifice area. The position of the metering piston is measured using a position sensor, such as an LVDT 53, and its position is controlled using a two stage servo-valve (MSV) 54. A spill valve (SSV) 52 of the splitting unit 50 controls the pressure differential set across the metering orifice such that control of metering valve position gives accurate control of flow delivered by the SMV into the mains connection pipe 37, this flow being the mains fuel flow sent to the mains manifold 33.

However, the fuel flow delivered through the SMV 51 is only a first portion of the HMU total metered fuel flow received by the splitting unit 50. A second portion of the received total metered fuel flow passes through a staging spill valve (SSV) 52 into the pilot connection pipe 36 to form the pilot fuel flow. The SSV can be a two-stage valve, with a pilot (first) stage of the SSV sensing the pressure differential set across the SMV and varying the position of a second stage piston to vary the area of the spill profile in a valve sleeve. Similarly, the SSV can be a single stage valve with a single piston both sensing the pressure differential set across the SMV and moving to vary the area of the spill profile. Opening the spill profile of the SSV permits more spill flow to pass to the pilot connection pipe and thus reduces the mains fuel flow from the SMV (as the mains flow+the pilot flow=HMU total metered fuel flow). The converse is true for SSV closure.

An advantage of the fuel flow metering and spill architecture of the splitting unit 50 is that control of the pressure drop across the SMV 51 can be achieved hydro-mechanically and is therefore capable of a significantly higher bandwidth than can be achieved with the control arrangement outlined in US 2016/0273775. More accurate control of mains flow during transients can thus be achieved, such as when the metered total fuel flow is changing, flow split is changing, or mains is being staged-in or out. Transient dips and spikes in fuel flow risk engine surge or flameout, so their reduction is important.

The SMV 51 is used to meter flow to the mains connection pipe 37 when mains is both staged-in or staged-out. In the latter case, a residual metered flow from the SMV can be used to form the cooling flow sent to the mains manifold 33 during pilot-only operation. For example, when the spool of the SMV moves into a position corresponding to pilot-only operation (FIG. 4) it could open an additional port on the SMV (not shown in FIG. 4) to open the cooling flow path. However, as shown in FIG. 4, another option is for the two-stage SSV 52 to meter a fixed flow in parallel to the SMV metering orifice. This flow is formed from a third portion of the received total metered fuel flow and is taken from a flow washed filter (SFWF) 56 at the inlet to the splitting unit 50. It then passes through a fixed servo orifice (SSO) 55 before passing through a variable poppet orifice within the SSV into the mains connection pipe downstream of the SMV. The rate of this fixed flow can be aligned with the cooling flow required to cool the mains manifold, allowing the SMV to be fully closed in pilot-only operation. This arrangement advantageously reduces the risk of excessive cooling flows resulting from any SMV control problems. In particular, such excessive cooling flows can increase the risk of undesired opening of the mains flow control valves 40. The two-stage SSV is also more robust than a single-stage spill valve to fuel borne contamination and coking, and thus provides better control of flow splitting between pilots and mains, which in turns offers better control of engine emissions. However, this does not exclude that the splitting unit could use a single-stage SSV instead of the two-stage SSV shown.

The metering and spill architecture of the splitting unit 50 is made possible by the need to maintain flow in the both the pilot manifolds 31, 32 and the mains manifold 33 when the engine is running. In pilots-only mode of operation, cooling flow is metered into the mains manifold for cooling purposes and re-joins the pilots burnt flow stream via the mains cooling valve 47.

A non-return valve 57 can be added to the bypass connection controlled by the mains cooling valve 47 between the pilot manifolds 31, 32 and the mains manifold 33. The non-return valve accommodates a scenario where one of the mains flow control valves 40 has failed open when mains is staged-out. Without the non-return valve it would be possible for pilot flow to pass to the mains manifold. This flow would increase as the pressure differential across the pilot discharge orifices of the fuel injectors increases. Passing to the mains combustion zone through the failed mains flow control valve, the flow could result in localised heating of turbine components, leading to a reduction of turbine life and possible turbine failure.

The operation of the mains cooling valve 47 and the non-return valve 57 is explained further below as part of the discussion of the mains flow control valves 40 and the split mains fuel manifold 33.

As mentioned above, the staging system 30 includes a lean blow out protection valve (LBOV) 41 controlled by way of a solenoid-operated control valve (LBSV) 42. The high pressure feed for the LBSV can be configured to be taken from the SFWF 56 at the inlet to the splitting unit 50. Any leakage flow from this feed then returns to the second pilot manifold 32 via the connection pipe 39. Benefits of such a servo supply for the LBOV are:
1. The leakage into the second pilot manifold 32 when the engine is running is part of the HMU metered total fuel flow, reducing the potential for delivery of incorrect flow levels to the engine.
2. When the engine is shut-down, fuel cannot leak into the staging system 30 via the LBOV 41. In the staging system 130 of FIG. 1, such leakage from HPf is possible if the seal of the solenoid operated control valve 142 is not drip tight when its plunger is in the position shown in FIG. 1.

It would be possible to configure the splitting unit 50 such that the metered flow stream from the SMV 51 is directed to the pilot connection pipe 36 to form the pilot fuel flow and the mains flow is formed from the remaining spill through the SSV 52. However, in this case the spill through the SSV 52 would need to be controlled quite accurately to produce the cooling flow when mains is staged-out. Metering the pilot flow means that the residual mains flow is the difference between the HMU metered total flow and metered pilot flow. Inaccuracies in metering either of these flows could result in too wide a range of cooling flows. In particular, too low a cooling flow could cause excessive fuel temperatures in the de-staged mains line, while too high a cooling flow could risk opening the FSVs 40 as a result of an excessive pressure differential between mains and pilot when mains is de-staged.

We turn next to consideration of the mains flow control valves 40 and the split mains fuel manifold 33. Conveniently, the mains flow control valves can be binary operated valves which permit or stop the delivery of metered mains flow to the mains combustion zone for burning. Closure of the mains flow control valves stops the mains flow to the combustor (de-staging), while opening of the valves allows mains flow (staging). Binary operation is caused by application or removal of a pressure differential applied to each binary valve and generated by a staging servo pump (SSP) 58 located in the servo line 33b of the mains fuel manifold and powered by a motor 59. In FIGS. 3 and 4, the motor is shown as an electrical motor, but this does not exclude that it can be a hydraulic (e.g. using fuel or other engine fluid) or a pneumatic motor.

As shown in FIGS. 3 and 4, the mains fuel manifold is split into the primary 33a and servo 33b lines at a cooling flow washed filter (CFWF) 63. The SSP 58 can be a gear-type positive displacement pump which draws flow through the CFWF into the servo line. Both the primary and the servo lines extend through each mains flow control valve 40 in series, before reuniting downstream of a back pressure orifice (BPO) 61. Thus the portion of the mains flow diverted through the servo line ultimately returns to the primary line for burning. The BPO provides a restriction to flow that generates a pressure differential across the SSP.

The mains flow control valves 40 each have a chamber containing a movable, spring-biased piston, with the chamber to a servo (spring) side of the piston being in fluid communication with the servo line 33b and the chamber to a primary (non-spring) side of the piston being in fluid communication with the primary line 33a. With a faster pump speed of the SSP 58, a higher pressure differential can be generated across the pistons. A high pressure differential overcomes a closing spring bias acting on the pistons, such that the valves open for staging. Removal of the differential allows the spring bias to close the valves.

Advantageously, the mains flow control valves 40 can have single face seals, rather than the dual face seals of the FSVs 140 of the system of FIG. 1, as some leakage between the primary 33a and servo 33b lines in the valves is acceptable.

As the mains flow control valves 40 are binary operated valves which do not rely on the pressure of the pilot flow, they do not allow the pilot flow to throttle the mains flow in the manner of the FSVs 140 of the system of FIG. 1 and without this throttling function it can be difficult to achieve the required range of pilot to mains flow splits. Accordingly, a mains throttle valve 62 can be provided in the splitting unit 50 to displace flow in a similar way to the FSVs 140. However, as the mains throttle valve is a single valve its net displacement area can be significantly smaller than that of the FSVs 140, which can help to reduce dynamic cross-talk between the pilot and mains flows.

The velocity of opening of the mains flow control valves 40 is determined by: the force balance on their pistons, the size of the restriction of the BPO 61 and the flow made available from the SSP 58. In contrast, the velocity of closing of the mains flow control valves is determined from their force balance and the size of the BPO restriction alone, since the pump speed is reduced (e.g. to zero) when de-staging. Advantageously, the system can effect transition of the mains flow control valves from one end to another in around one second.

Although the SSP 58 is illustrated in FIGS. 3 and 4 as a gear pump, any type of positive displacement pump can be used to generate the servo differential pressure. As another option, a roto-dynamic pump, such as a centrifugal pump, could be used to generate the differential pressure.

The binary operating mains flow control valves 40 can improve the robustness of the staging system 30, and reduce the possibility of undesirable operation. In particular, one of the problems with FSVs 140 shown in FIG. 1, is the effect of one FSV failing open. At low metered flows, a tendency is for the majority of the flow to pass through the failed-open valve. The remainder of the FSVs would be less open or closed and pass less flow, creating a local hot spot in the engine, which can elevate turbine temperature to the point where turbine integrity is lost or turbine life is significantly reduced. This can be avoided, however, in the staging system 30 of FIGS. 3 and 4, by having the normally open position of the mains flow control valves 40 equal to the position of a failed-open valve.

A further benefit of the binary operating mains flow control valves 40 is their reduced sensitivity to variation in friction (from differences in build, wear, and debris contamination) acting on the piston of each valve. For the FSVs 140 shown in FIG. 1, this variation results in degradation in flow split between burners, affecting combustion emissions and potentially creating turbine hot spots as above. The mains flow control valves 40, by contrast, can tolerate significantly higher frictional loads before their operation is affected.

After completion of de-staging, the SSP 58 can be run at a slow speed such that some of the cooling flow generated by the splitting unit 50 (as discussed above) is sent through the servo line 33b as well as through the primary line 33a. The relative amounts of the cooling flows through the lines can be managed by appropriate control of pump speed informed by measurement of servo pressure differential between lines 33b and 33a or flow rate in the servo line 33b.

A position sensor, e.g. in the form of an LVDT 64, on the non-return valve 57 can be used to provide flow measurement and thereby identify the occurrence of a mains flow control valve 40 that has failed in an open position when required to be closed. The EEC can then take suitable action to end the delivery of the cooling flow by ceasing the delivery of total flow to the staging unit or staging in mains to maintain delivery of engine power, albeit at the expense undesired engine emissions. More particularly, if a mains flow control valve fails in an open position when it should be closed, the subsequent leakage of cooling flow to the combustion process results in a lower pressure in the mains fuel manifold 33 than in the pilot fuel manifolds 31, 32. This then causes the non-return valve to close when it should be open, thereby announcing the failure.

The mains cooling valve 147 in the system of FIG. 1 is solenoid operated and located relatively close to the injectors 134. In contrast, the mains cooling valve 47 in the staging system 30 of FIGS. 3 and 4, is closer to the splitting unit 50 and is hydraulically operated on the basis of the pressure differential between the primary 33a and the servo 33b lines. These changes improve the robustness of the mains cooling valve. Firstly, the location of the valve allows its relatively small cooling orifice to reside in an environment where temperature can be better controlled, reducing a risk of blockage due to build-up of fuel breakdown products. Secondly, the hydraulic operation allows the valve to operate with larger forces than solenoid operation, enabling a more robust valve structure.

A relief valve 60 connected across the SSP 58 can be provided to limit pressures in the servo line 33b in the event of blockage of the BPO 61. However, this relief function can be provided through limitation of input power if an electric drive is used to drive the SSP and the pump speed is measured.

Further variants of the combustion staging system shown in FIGS. 3 and 4 are possible. For example:

1) The mains flow control valves 40 can be configured to operate at different pressure differentials so as to provide a means of staging mains. As an example, half of the total number of the valves could use a higher spring load than the other half, such that operation of the SSP 58 could be used to open half the valves before the remainder open. This increases the minimum flow passing through any one mains flow control valve to the corresponding mains discharge orifice, thus avoiding potential issues of degraded operation resulting from undesirable flow regimes within the nozzle assembly of the injectors at low flows.
2) A differential pressure sensor could be provided to sense the pressure differential generated by the SSP 58 such that closed loop control can be used to more accurately regulate the differential generated by the SSP. The loop could be closed by the EEC, with pump speed being varied to change delivered differential. Accurate regulation of multiple pressure levels could be beneficial to achieve mains staging.
3) Sensing of the differential pressure between the mains and pilot flows can be used to diagnose a mains flow control valve 40 in a failed open state when mains is staged-out. Such pressure sensing can be an alternative to the measurement provided by the LVDT 64 of the non-return valve 57.
4) The staging system could use a splitting unit based on a fuel flow splitting valve (FFSV) of the type shown in FIG. 1 in place of the metering and spill architecture of the splitting unit 50 of FIGS. 3 and 4.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A combustion staging system for fuel injectors of a multi-stage combustor of a gas turbine engine, the system having:
    a splitting unit which receives a metered total fuel flow and controllably splits the metered total fuel flow into an out-going pilot fuel flow and an out-going mains fuel flows to perform pilot-only and pilot-and-mains staging control of the combustor;
    a pilot fuel manifold and a mains fuel manifold which respectively receive the pilot fuel flow and the mains fuel flow, the mains fuel manifold being split into a primary line and a servo line such that each of the primary line and the servo line receives a respective portion of the mains fuel flow;
    a plurality of mains flow control valves which distribute the mains fuel flow from the mains fuel manifold to mains discharge orifice a respective one of the fuel injectors of the combustor, both the primary line and the servo line extending to the plurality of mains flow control valves before reuniting; and
    a servo pump operable to change a pressure in the servo line relative to a pressure in the primary line; and
    wherein each of the plurality of mains flow control valves has a chamber containing a movable piston, the chamber to a primary side of the piston being fed by the primary line, the chamber to a servo side of the piston being fed by the servo line, the piston being biased towards a closed pilot-only position which prevents the mains fuel flow out of the primary side of the chamber to the mains discharge orifice of the respective one of the fuel injectors, and the piston being movable under an increase in the pressure in the servo line relative to the pressure in the primary line to an open pilot-and-mains position which allows the mains fuel flow out of the primary side of the chamber to the mains discharge orifice of the respective one of the fuel injectors.

2. A combustion staging system according to claim 1, wherein the primary line and the servo line reunite downstream of a back pressure orifice located in the servo line to maintain the pressure in the servo line, changed by the servo pump, relative to the pressure in the primary line.

3. A combustion staging system according to claim 1, wherein the plurality of mains flow control valves are binary operating valves which are either fully open or fully closed.

4. A combustion staging system according to claim 1, wherein the splitting unit includes a metering valve and a spill valve, a first portion of the metered total fuel flow received by the splitting unit being an inflow to the metering valve and a second portion of the metered total fuel flow received by the splitting unit being an inflow to the spill valve, the metering valve being configured to controllably determine a fuel flow rate of a metered outflow formed from the first portion of the metered total fuel flow, the spill valve being configured to produce a spilled outflow formed from the second portion of the metered total fuel flow, and the spill valve being further configured to sense a pressure differential between the inflow to the metering valve and the metered outflow and to vary an amount of the spilled outflow in response to the pressure differential, whereby the metered outflow forms one of the pilot fuel flow and mains fuel flow, and the spilled outflow forms other of the pilot fuel flow and mains fuel flow.

5. A combustion staging system according to claim 4, wherein the splitting unit includes a mains throttle valve which throttles the out-going mains fuel flow from the splitting unit in response to a pressure of the out-going pilot fuel flow from the splitting unit.

6. A combustion staging system according to claim 4, wherein the metered outflow forms the mains fuel flow, and the spilled outflow forms the pilot fuel flow.

7. A combustion staging system according to claim 4, wherein the metering valve has a spool defining a spool position which is controllable to determine the fuel flow rate of the metered outflow.

8. A combustion staging system according to claim 7, wherein the metering valve further has a device to measure the spool position.

9. A combustion staging system according to claim 1, wherein the splitting unit sends a cooling flow to the mains fuel manifold during pilot-only operation; and wherein the system further has a mains cooling valve which, during pilot-only operation, opens a bypass connection between the mains fuel manifold and the pilot fuel manifold such that the cooling flow passes from the mains fuel manifold to the pilot fuel manifold.

10. A combustion staging system according to claim 9, wherein the system further has a non-return valve in the bypass connection which prevents flow in a direction from the pilot fuel manifold to the mains fuel manifold.

11. A combustion staging system according to claim 10, wherein the non-return valve further has a device to measure flow through the non-return valve.

12. A combustion staging system according to claim 9, wherein the splitting unit includes a metering valve and a spill valve, a first portion of the metered total fuel flow received by the splitting unit being an inflow to the metering valve and a second portion of the metered total fuel flow received by the splitting unit being an inflow to the spill valve, the metering valve being configured to controllably determine a fuel flow rate of a metered outflow formed from the first portion of the metered total fuel flow, the spill valve being configured to produce a spilled outflow formed from the second portion of the metered total fuel flow, and the spill valve being further configured to sense a pressure differential between the inflow to the metering valve and the metered outflow and to vary an amount of the spilled outflow in response to the pressure differential, whereby the metered outflow forms the mains fuel flow, and the spilled outflow forms the pilot fuel flow; and wherein the spill valve sends some or all of the cooling flow to the mains fuel manifold during pilot-only operation.

13. A combustion staging system according to claim 12, wherein the spill valve receives a third portion of the metered total fuel flow and forms some or all of the cooling flow therefrom.

14. A fuel supply system having:
a fuel metering valve which is configured to receive a flow of pressurised fuel and to form therefrom the metered total fuel flow; and
the combustion staging system according to claim 1, the splitting unit of the combustion staging system receiving the metered total fuel flow from the fuel metering valve.

15. A gas turbine engine having the fuel supply system according to claim 14.

* * * * *